United States Patent
De Courville et al.

(12) 
(10) Patent No.: US 6,198,782 B1
(45) Date of Patent: Mar. 6, 2001

(54) ESTIMATION OF FREQUENCY OFFSETS IN OFDM COMMUNICATION SYSTEMS

(75) Inventors: Marc De Courville, Paris; Sebastien Simoens, L'Ecole; Veronique Buzenac Settineri, Massy, all of (FR)

(73) Assignee: Motorola, Inc., Schaumburg, IL (US)

( * ) Notice: Subject to any disclaimer, the term of this patent is extended or adjusted under 35 U.S.C. 154(b) by 0 days.

(21) Appl. No.: 09/496,302

(22) Filed: Feb. 1, 2000

(30) Foreign Application Priority Data

Feb. 11, 1999 (EP) .................................................. 99400319

(51) Int. Cl.[7] .................................................. H04L 27/06
(52) U.S. Cl. .......................... 375/341; 375/355; 375/326; 370/208
(58) Field of Search .................................... 375/341, 355, 375/326; 370/203, 208, 210

(56) References Cited

U.S. PATENT DOCUMENTS

| | | | |
|---|---|---|---|
| 5,206,884 | * 4/1993 | Bingham | 375/344 |
| 5,345,440 | 9/1994 | Gledhill et al. | |
| 5,450,456 | 9/1995 | Mueller . | |
| 5,732,113 | * 3/1998 | Schmidl et al. | 375/355 |
| 5,802,117 | 9/1998 | Ghosh . | |
| 6,035,003 | * 3/2000 | Park et al. | 375/326 |

FOREIGN PATENT DOCUMENTS

| | | |
|---|---|---|
| WO 95/19671 | 7/1995 | (WO) . |
| WO 96/04716 | 2/1996 | (WO) . |
| WO 98/00946 | 1/1998 | (WO) . |

OTHER PUBLICATIONS

"A new method for joint cancellation of clock and carrier frequency offsets in OFDM recivers over frequency selective channels", Courville et al. IEEE 2000, pp. 390–394.*

Bernard Le Floch, Michael Alard, Member, IEEE, and Claude Berrou, Member IEEE; "Coded Orthogonal Frequency Division Multiplex"; Proceedings of the IEEE, vol. 83, No. 6, Jun. 1995; pp. 982–996.

In Ho Hwang et al., "Frequency and Timing Period Offset Estimation Technique for OFDM Systems." Electronic Letters, vol. 34, No. 6, Mar. 19, 1998, pp. 520–521.

* cited by examiner

Primary Examiner—Temesghen Ghebretinsae
(74) Attorney, Agent, or Firm—Douglas D. Fekete

(57) ABSTRACT

Apparatus for estimating carrier and clock frequency offsets in OFDM systems employs a maximun likelihood estimator operation on the demodulated signals. The invention has the benefit of low complexity and obviates the need for any requirement for a dedicated training channel.

4 Claims, 5 Drawing Sheets

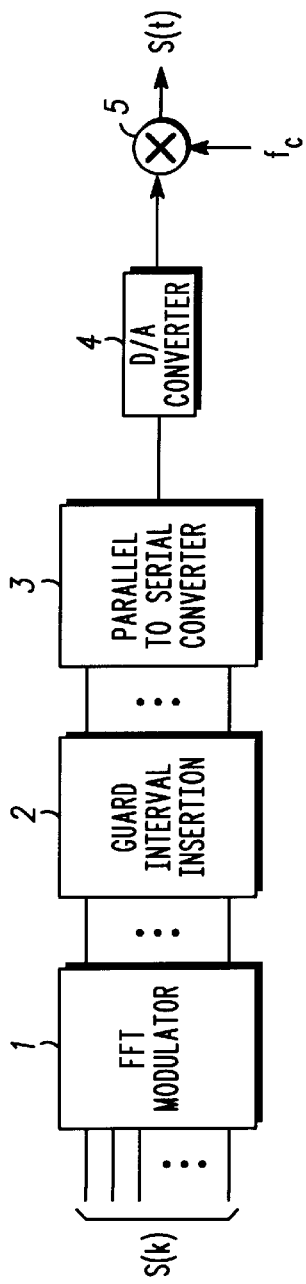
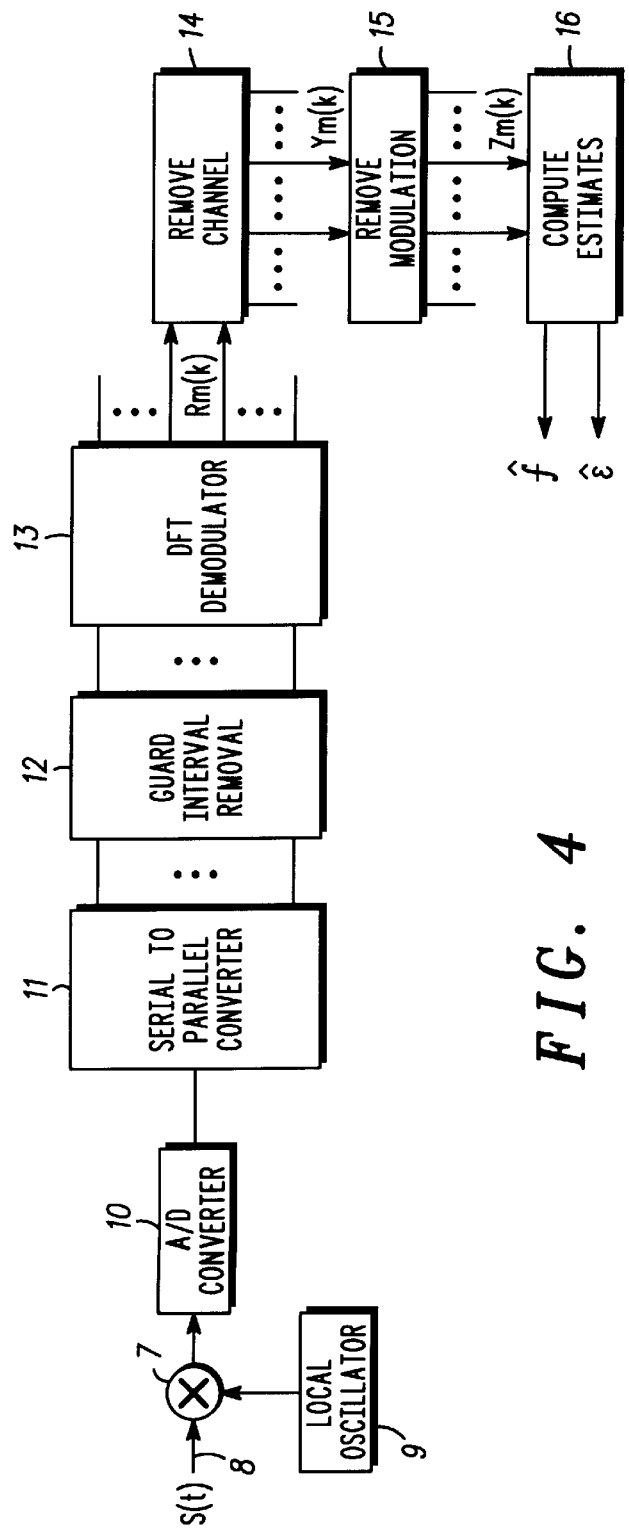
FIG. 3
FIG. 4

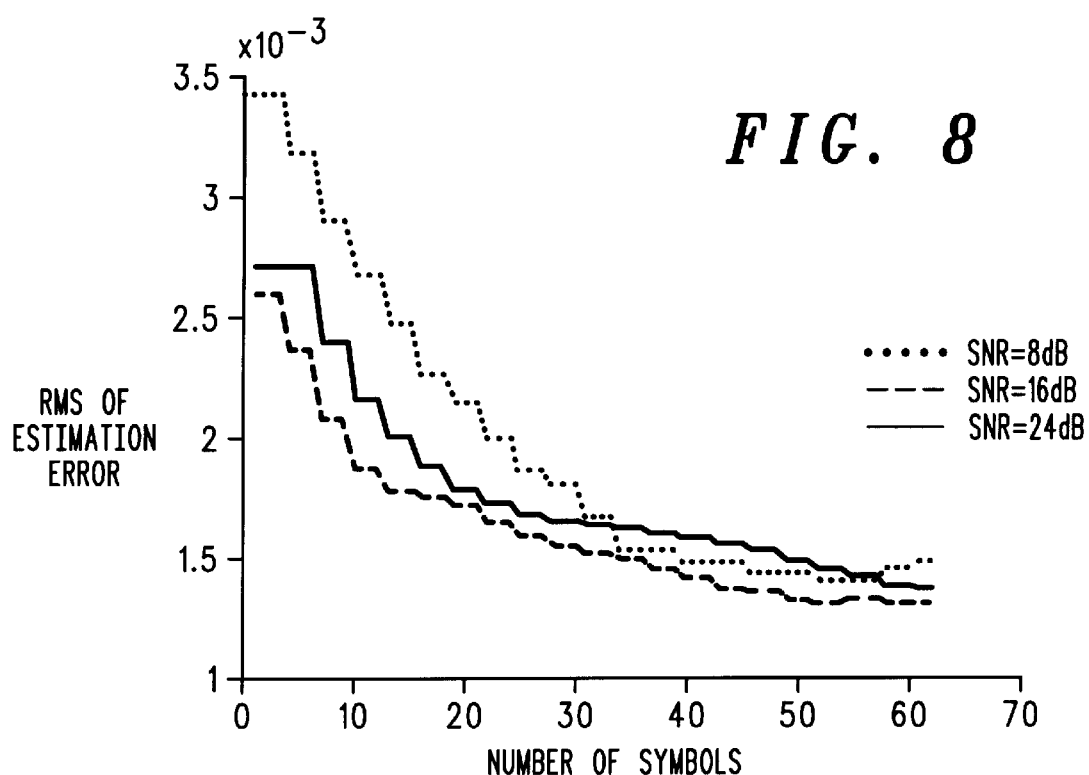
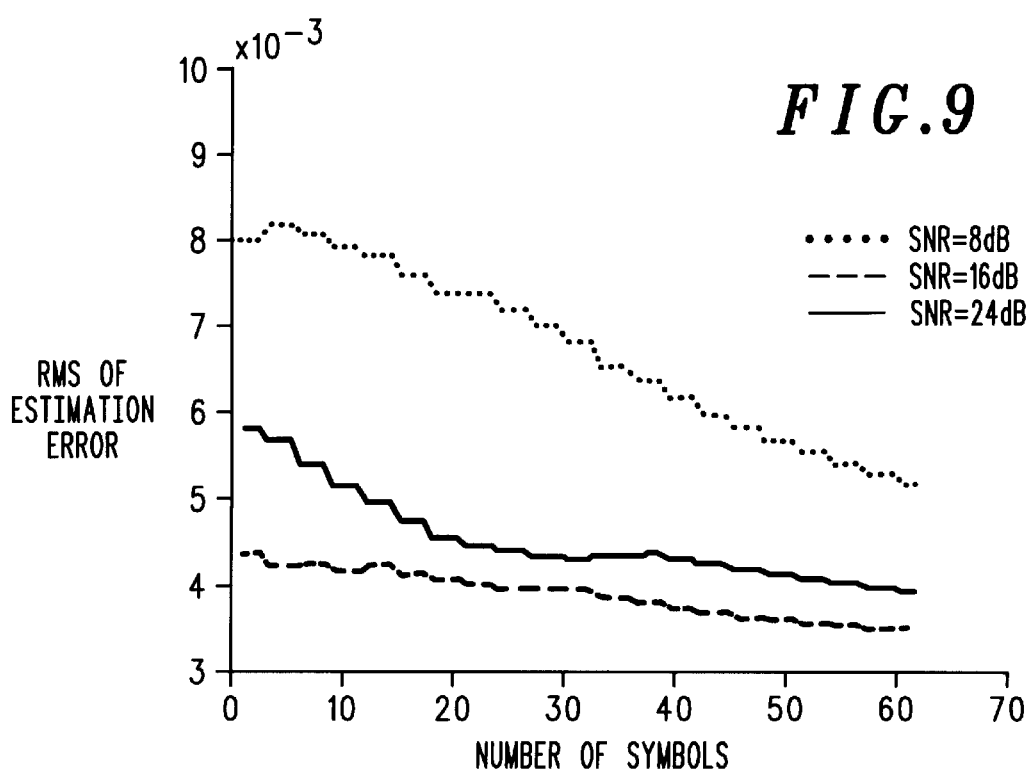

ESTIMATION OF FREQUENCY OFFSETS IN OFDM COMMUNICATION SYSTEMS

This invention relates to communication systems and particularly to those employing orthogonal frequency division multiplexing (OFDM) modulation methods.

OFDM is a technique whereby information symbols are communicated from a transmitter to a receiver over a plurality of sub-carriers.

Carrier and clock frequency offsets can produce large degradations of the Bit Error Rate (BER) performance of Orthogonal Frequency Division Multiplex (OFDM) systems. See for example Proc. IEEE 83(6) 982–996 June 1995 and Proc. COST254 1997. Indeed they not only produce extra-noise due to Inter Carrier Interference (ICI) but also a parasitic rotation of the symbols which also increases the BER.

Herein, carrier frequency offset means any difference in frequency between the carrier frequency generators in the transmitting and receiving circuitry and clock frequency offset means any difference between the sampling rates of the transmitting and receiving circuitry.

There already exist several methods for estimating and compensating a carrier frequency offset. See for example, U.S. Pat. No. 5,450,456 (Mueller) and Elec. Lett. 33(2) 113–114 January 1997. However, using either of these known methods, the residual carrier frequency offset can rise up to a few percent of the sub-carrier spacing and there still remains a degradation. As regards clock frequency offset, the degradation depends on the number of sub-carriers. If this number is large, this may prevent the designer from relaxing constraints on the receiver's clock generation mechanism.

To illustrate the problem, consider a typical OFDM transmission system such as Digital Audio Broadcasting (DAB) mode 1. In FIG. 1 and FIG. 2, the degradation due to ICI is plotted. After correction with the classical algorithms, the carrier frequency offset can reach 3% of the sub-carrier spacing (in FIG. 2, this corresponds to f=3% where f is the carrier frequency offset expressed in number of sub-carrier spacings, N is the number of sub-carriers and T is the reciprocal of the sampling rate.) A low-price ageing clock oscillator can have a frequency offset of 50 ppm (in FIG. 1, this corresponds to a normalised clock frequency offset e=5.10$^{-5}$). Then at a Signal to Noise Ratio (SNR) of 20 dB, the ICI degradation can represent more than 1 dB. Moreover, the parasitic rotation due to f can represent 15% of the angle separating neighbour points of the QPSK (Quadrature Phase Shift Keying) constellation. The parasitic rotation due to e can represent 20% of this angle. Therefore, the error probability rises up severely.

Known methods which exist for reducing clock and carrier frequency offsets work on the assumption that time synchronization is achieved and that carrier frequency offset has been compensated up to a certain precision. However, there is still a need for a method with reduced complexity and better performance.

In cable transmission, a sub-carrier is dedicated to clock recovery, which implies a loss of useful capacity of the system.

In U.S. Pat. No. 5,345,440 (Gledhill) a method is presented for estimating the carrier frequency offset and the clock offset. But only a formula for straight carrier frequency offset estimation is provided, whereas no formula for directly estimating the clock frequency offset is given. Besides, carrier and clock are estimated separately. Both phenomena produce similar effects, so that a joint method for estimating both would have an improved efficiency and a reduced complexity.

In Elec. Lett. 34(6) 520–521 March 1998, a method for jointly estimating carrier and clock frequency offsets is proposed. However, this method has the disadvantage of poor performance on a frequency-selective channel, such as the radio-mobile channel or cable channels.

In U.S. Pat. No. 5,802,117 (Ghosh), a joint method working on any channel is presented. However, it is not a 'blind' technique ie. It relies on a specific training signal. Therefore, it cannot be applied on any existing standardised communication system.

There is subsequently a need for jointly and blindly estimating carrier and clock frequency offsets on any channel, including frequency selective ones and it is this need that the present invention addresses.

Accordingly, the present invention comprises apparatus for estimating carrier frequency offset and sampling frequency offset between transmitter circuitry and receiver circuitry which communicate over a channel of an OFDM system, the apparatus including in a receiver circuit;

a local oscillator having a frequency fb for converting a received OFDM modulated signal s(t), representing information symbols S(k) having components Sm(k) and sampled at a first sampling rate ft and modulated onto a carrier of frequency fc, to a base-band signal, an analogue to digital converter having a second sampling rate fr for sampling the baseband signal, a demodulator for performing a discrete Fourier transform on the sampled baseband signal to generate blocks of symbols R(k) having components Rm(k) representing the information symbols S(k) of components Sm(k), and characterised by; a first module for removing parasitic effects of the channel on R(k) to generate at least one block Y(k) of components Ym(k), a second module for removing modulation effects from Y(k) to generate at least one block Z(k) of components Zm(k) and to compute V of components Vm where Vm=/Ym/, and a third module for estimating terms A and B relating respectively to the carrier frequency offset /fc−fb/ and the sampling frequency offset /ft−fr/ by performing a joint maximun likelihood estimation (MLE) such that;

$$\begin{cases} \sum_{\substack{m=-\frac{K}{2} \\ m \neq 0}}^{m=\frac{K}{2}} [-V_m \mathcal{R}(Z_m)\sin(A+mB) + V_m \mathrm{I}(Z_m)\cos(A+mB)] = 0 \\ \sum_{\substack{m=-\frac{K}{2} \\ m \neq 0}}^{m=\frac{K}{2}} [-mV_m \mathcal{R}(Z_m)\sin(A+mB) + mV_m \mathrm{I}(Z_m)\cos(A+mB)] = 0 \end{cases}$$

The invention thus provides a method and apparatus for jointly estimating carrier and clock frequency offsets on any channel, including frequency selective ones.

The invention computes the estimates $\hat{f}$ of f and $\hat{e}$ of e, by analyzing the rotations produced by clock and carrier frequency offsets on the received signals. The estimate $\hat{f}$ can be added to that obtained with known algorithms, and may be used to compensate the carrier frequency offset on a time-domain signal. The estimate $\hat{e}$ can be used to steer the receiver clock frequency (e.g: using a Voltage Controlled Crystal Oscillator VCXO). Thus, the effect of carrier and clock frequency offsets is brought down to a negligible level, at the expense of slightly higher complexity.

Advantages of the method compared with existing techniques are:

The complexity required is low (a few times K, for a typical precision, where K is the number of useful sub-carriers).

The implementation of the invention allows either to reduce the cost of the receiver by relaxing constraints on the clock oscillator and on the carrier synchronization mechanism, or to save power (the gain can then be greater than 1 dB)

Since the method used is blind, it can be applied on existing standards such as ADSL, DAB or DVB-T. It works either on coherent or on differential modulation schemes;

The method is flexible. The ability to track f and e depends on the number of symbols over which the estimation is performed. The more symbols, the more accurate and precise the estimate, but the lower the ability of tracking. Furthermore, the symbols picked up for the estimate do not need to be consecutive. For instance, in a time-varying channel, the chosen symbols can be spaced out. Thus, the complexity decreases and the estimation takes benefit from diversity effects. To summarize, it is easy to make a trade-off between complexity, performance and tracking.

The invention can be used to advantage in the case of DAB because the method used is blind and can be easily applied on the differentially coded QPSK transmission.

The invention can also be used as an alternative to the use of a dedicated channel.

Some embodiments of the invention will now be described, by way of example only, with reference to the drawings of which:

FIG. 3 is a schematic block diagram of a conventional OFDM transmitter;

FIG. 4 is a schematic block diagram of an OFDM receiver incorporating carrier and clock frequency offset compensation means in accordance with the invention;

FIG. 8 is a graph showing number of symbols v RMS clock frequency offset estimation error for a DAB mode, OFDM channel operating in accordance with the invention; and FIG. 9 is a graph showing number of symbols v RMS carrier frequency offset estimation error for a DAB mode, OFDM channel operating in accordance with the invention.

Figure 1:
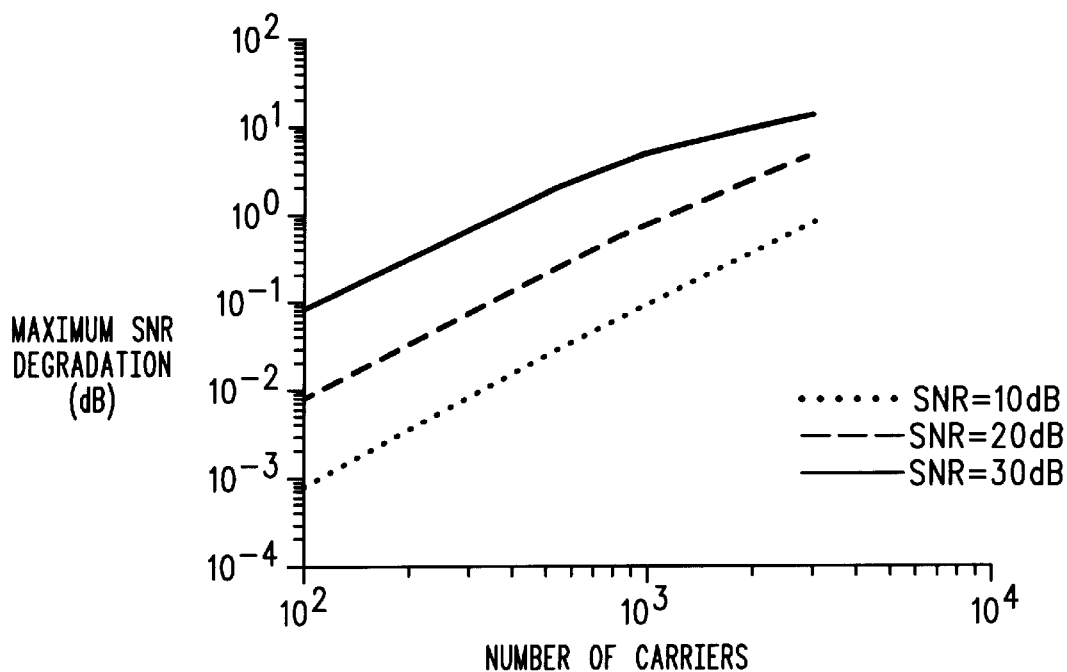
FIG. 1 is a graph showing number of sub-carriers v Signal-to-noise degradation due to ICI in an OFDM system having a relative clock frequency offset of 5.10exp(-5)
Figure 2:
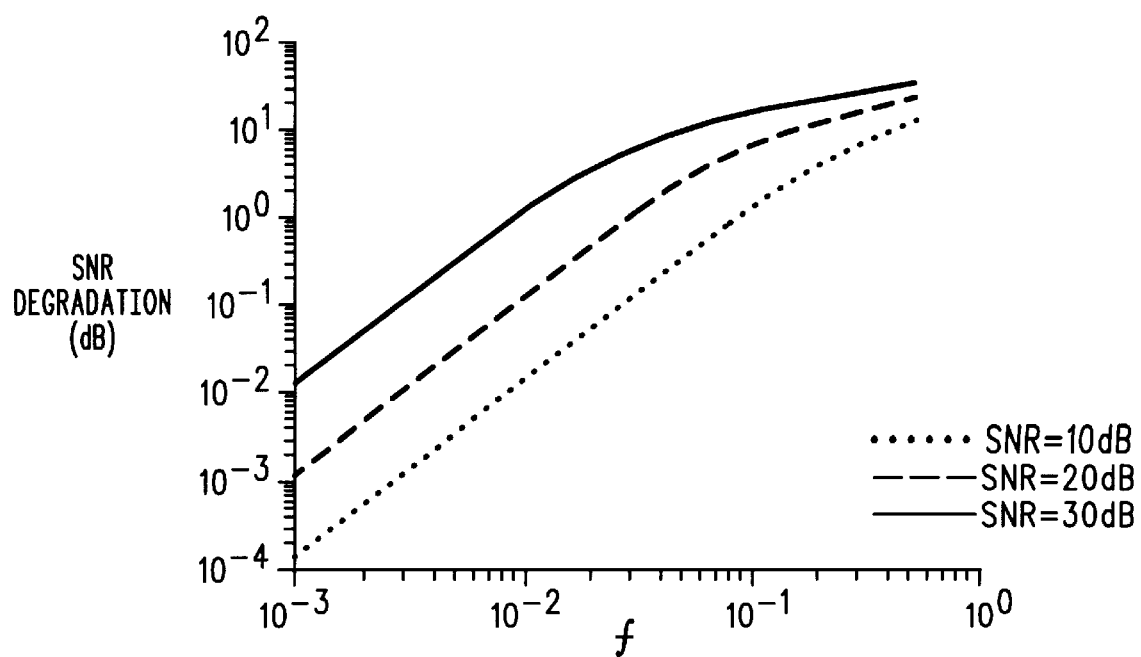
FIG. 2 is a graph showing carrier frequency offset v Signal-to-noise degradation in an OFDM system.

With reference to FIG. 3, an OFDM transmitter comprises an Inverse Fast Fourier Transform modulator 1, a guard interval insertion block 2, a Parallel to Serial converter 3 a Digital to Analogue converter 4 and a mixer 5 having a local oscillator input on line 6. Information symbols S(k) are fed to the input of the modulator 1. The outputs from the modulator pass through block 2 where a guard interval is inserted. After guard interval insertion, the signals are fed to the Parallel-to-Serial converter 3 and then the resulting multiplexed output is fed to the Digital to Analogue converter 4. The Digital to Analogue converter 4 has a sampling frequency ft=1/T which is also the total bandwidth of the multiplexing process. The resulting analogue signal is modulated onto a carrier of frequency fc by the action of the mixer 5 for transmission over a radio channel to the receiver of FIG. 4 There are N sub-carriers with K useful sub-carriers. The bandwidth is split among the N sub-carriers, so that the sub-carrier spacing is $$\frac{1}{NT}.$$

Refering now to FIG. 4, an OFDM receiver comprises a mixer 7 for converting the incoming signal on line 8 to baseband. A baseband signal at frequency fb,(nominally the carrier frequency) is supplied to the mixer 7 by a local oscillator 9. The baseband signal is then sampled in an Analogue to Digital converter 10 at a sampling rate fr (nominally the transmitter sampling rate, ft).

The difference between the carrier frequency fc at the transmitter and the local oscillator frequency fb at the receiver is called the carrier frequency offset (fc−fb). Expressed in terms of the number of sub-carrier spacings, f=NT(fc−fb) The difference between the sampling frequency at the receiver and at the transmitter is called the clock frequency offset (fr−ft). The relative (or normalised) clock frequency offset is denoted $$e = \frac{\Delta\left(\frac{1}{T}\right)}{\frac{1}{T}} = (fr - \mathrm{ft})/\mathrm{ft}$$

The output signal from the Digital to Analogue converter 10 is fed to a Serial to Parallel converter 11. The resulting de-multiplexed outputs have the guard interval removed by the guard interval remover block 12 and then pass to a Discrete Fourier Transform demodulator 13. The outputs of the Discrete Fourier Transform demodulator 13 are subsequently passed through, in sequence, a Remove Channel Module 14, a Remove Modulation Module 15 and a Computation of Estimates Module 16. The outputs of the Computation Module 16 are the desired estimates of f and e.

The demodulator 13 produces blocks of symbols Rm(k) at its outputs. In order to generate the estimates of f and e, the apparatus of FIG. 4 measures the phase drift due to carrier and clock frequency offsets between symbol (k−1) and symbol k. However, the phase has drifted continuously during the previous k−2, k−3, . . . symbols because of carrier and clock frequency offsets and also because of the effects of the channel. The Remove Channel module 14 isolates the phase drift due to carrier, clock and channel between symbol (k−1) and symbol k.

Hence, at the output of the Discrete Fourier Transform (DFT) demodulator13, the k$^{th}$ block of symbols $$R_m(k) - \frac{K}{2} \leq m \leq \frac{K}{2}, m \neq 0$$

is processed by the Remove Channel Module14. Here, the parasitic effects of the channel and of the rotation due to carrier and clock offset on block k−1 are removed. At the output of the Module 14, the block of symbols $$Y_m(k) - \frac{K}{2} \le m \le \frac{K}{2}, m \ne 0$$

is obtained. The processing procedure in Module 14 can consist either in differential demodulation or in equalization. For instance, in DAB, we have $Y_m(k) \le R_m(k)R_m(k-1)$.

A second processing step in the Remove Modulation Module 15 removes the "useful" rotation, due to modulation, from $Y_m(k)$ and also computes the quantity $V_m = |Y_m|$. Thus there remains only the parasitic rotation produced by carrier and frequency offsets, in addition with various sources of perturbation (including thermal noise). The output of the Module 15 is the block $$Z_m(k) - \frac{K}{2} \le m \le \frac{K}{2}, m \ne 0.$$

For example, in DAB, the rule can be the following:

if $\mathcal{R}(Y_m(k)) > 0$ and $\mathcal{I}(Y_m(k)) > 0$ then $Z_m(k) = Y_m(k) * e^{-j\frac{\pi}{4}}$ if $\mathcal{R}(Y_m(k)) < 0$ and $\mathcal{I}(Y_m(k)) > 0$ then $Z_m(k) = Y_m(k) * e^{-j\frac{3\pi}{4}}$ if $\mathcal{R}(Y_m(k)) < 0$ and $\mathcal{I}(Y_m(k)) < 0$ then $Z_m(k) = Y_m(k) * e^{-j\frac{5\pi}{4}}$ if $\mathcal{R}(Y_m(k)) > 0$ and $\mathcal{I}(Y_m(k)) < 0$ then $Z_m(k) = Y_m(k) * e^{-j\frac{7\pi}{4}}$ But in the case of DAB, the rule can also be: $|Z_m(k)| = |Y_m(k)|$; $\arg(Z_m(k)) = 4 * \arg(Y_m(k))$ In a third step, a joint Maximum Likelihood Estimator (MLE) for $(f, \epsilon)$ is computed from the observation $$Z_m(k) - \frac{K}{2} \le m \le \frac{K}{2}, m \ne 0.$$

The joint MLE requires the resolution of the following system of equations:

$$\begin{cases} \sum_{\substack{m=-\frac{K}{2} \\ m \ne 0}}^{m=\frac{K}{2}} [-V_m \mathcal{R}(Z_m)\sin(A+mB) + V_m \mathcal{I}(Z_m)\cos(A+mB)] = 0 \\ \sum_{\substack{m=-\frac{K}{2} \\ m \ne 0}}^{m=\frac{K}{2}} [-mV_m \mathcal{R}(Z_m)\sin(A+mB) + mV_m \mathcal{I}(Z_m)\cos(A+mB)] = 0 \end{cases} \quad \text{(equation 1)}$$

It can be verified that, as long as $$|A| + \frac{K|B|}{2}$$

is small compared to 1, a $1^{st}$ order approximation of the sine and cosine terms is enough. Then, the third processing step consists in computing the following coefficients:

$$\alpha_2 = \sum_{\substack{m=-\frac{K}{2} \\ m \ne 0}}^{m=\frac{K}{2}} mV_m \mathcal{R}(Z_m); \quad \alpha_3 = \sum_{\substack{m=-\frac{K}{2} \\ m \ne 0}}^{m=\frac{K}{2}} m^2 V_m \mathcal{R}(Z_m);$$

-continued $$\alpha_4 = \sum_{\substack{m=-\frac{K}{2} \\ m \ne 0}}^{m=\frac{K}{2}} V_m \mathcal{R}(Z_m)$$

$$\alpha_1 = \sum_{\substack{m=-\frac{K}{2} \\ m \ne 0}}^{m=\frac{K}{2}} mV_m \mathcal{I}(Z_m); \quad \alpha_5 = \sum_{\substack{m=-\frac{K}{2} \\ m \ne 0}}^{m=\frac{K}{2}} V_m \mathcal{I}(Z_m)$$

And;

$$\begin{cases} \hat{A} = \frac{\alpha_3 \alpha_5 - \alpha_1 \alpha_2}{\alpha_3 \alpha_4 - \alpha_2^2} \\ \hat{B} = \frac{\alpha_1 - \alpha_2 \hat{A}}{\alpha_3} \end{cases}$$

$\hat{A}$ and $\hat{B}$ are proportional respectively to the desired $\hat{f}$ e and $\hat{\epsilon}$. The ratio depends on which method has been chosen for removing the modulation. For example, in DAB, if the first rule was applied, then:

$$\begin{cases} \hat{f} = \frac{N}{2\pi(N+D)} \hat{A} \\ \hat{\epsilon} = \frac{N}{2\pi(N+D)} \hat{B} \end{cases}$$

But if the second rule was applied, then:

$$\begin{cases} \hat{f} = \frac{N}{8\pi(N+D)} \hat{A} \\ \hat{\epsilon} = \frac{N}{8\pi(N+D)} \hat{B} \end{cases}$$

Where N is the number of samples and D is the length of the guard interval in terms of sample number.

The MLE system of equations is derived as follows. By the action of the Remove Channel Module 14 and the Remove Modulation Module 15, the vector $$Z = \left( Z_{-\frac{K}{2}}, \ldots, Z_{-1}, Z_1, \ldots, Z_{\frac{K}{2}} \right)^t$$

is obtained.

This vector is approximated to the model:

$$Z_m(k) = V_m(k) e^{jA} e^{jmB} + \gamma_m(k) \text{ with}$$

$$-\frac{K}{2} \le m \le \frac{K}{2}, m \ne 0$$

where $V_m(k)$ represents the modulus of the useful part of the signal, $V_m(k) \approx |Z_m(k)| \approx |Y_m(k)|$ for high signal to noise ratio.

$\gamma$:AWGN (Additive white Gaussian noise) lit is desired to fit f and e so that the model best fits reality. Introducing vector $$V = \left(V_{-\frac{K}{2}}, ..., V_{-1}, V_1, ..., V_{\frac{K}{2}}\right)^t,$$

the Maximum Likelihood Estimator for f and e according to the observation Z is the mathematical formula:

$$(\hat{f}e, \hat{\epsilon}) = \text{ArgMax}_{(f,\epsilon)}[-(Z-Ve^{jA}e^{jmB})^H(Z-Ve^{jA}e^{jmB})]$$

From which equation (1) above is derived.

In an alternative embodiment, the estimation may be improved by using L blocks $Z(k_1), Z(k_2), ..., Z(k_L)$ instead of just one block.

In this case, the coefficients to be computed for the estimate are the $$\alpha_i = \sum_{j=1}^{L} \alpha_{i,k_j}, \; i \in \{1, 2, 3, 4, 5\}$$

The total number of blocks chosen would depend upon the processing time available.

The estimation may be performed on successive symbols $k_j = k_1, k_2, ... k_L$, with $k_2 = k_1+1$, $k_3 = k_2+1$ etc. However, when the channel variations are slow, the channel attenuation is almost the same on consecutive symbols. So, if channel fading worsens the estimate, using successive symbols will increase the complexity but not significantly improve the estimate. In this case then, the symbols chosen for the estimation can be spaced out, for instance choosing $k_2 = k_1+5$, $k_3 = k_2+5$ ... etc. The spacing chosen will depend on how fast the channel is varying.

In a further alternative embodiment and in order to reduce the complexity of the process, coefficients $V_m$ can be replaced by 1. No loss of efficiency has been experienced in simulations.

Figure 5:
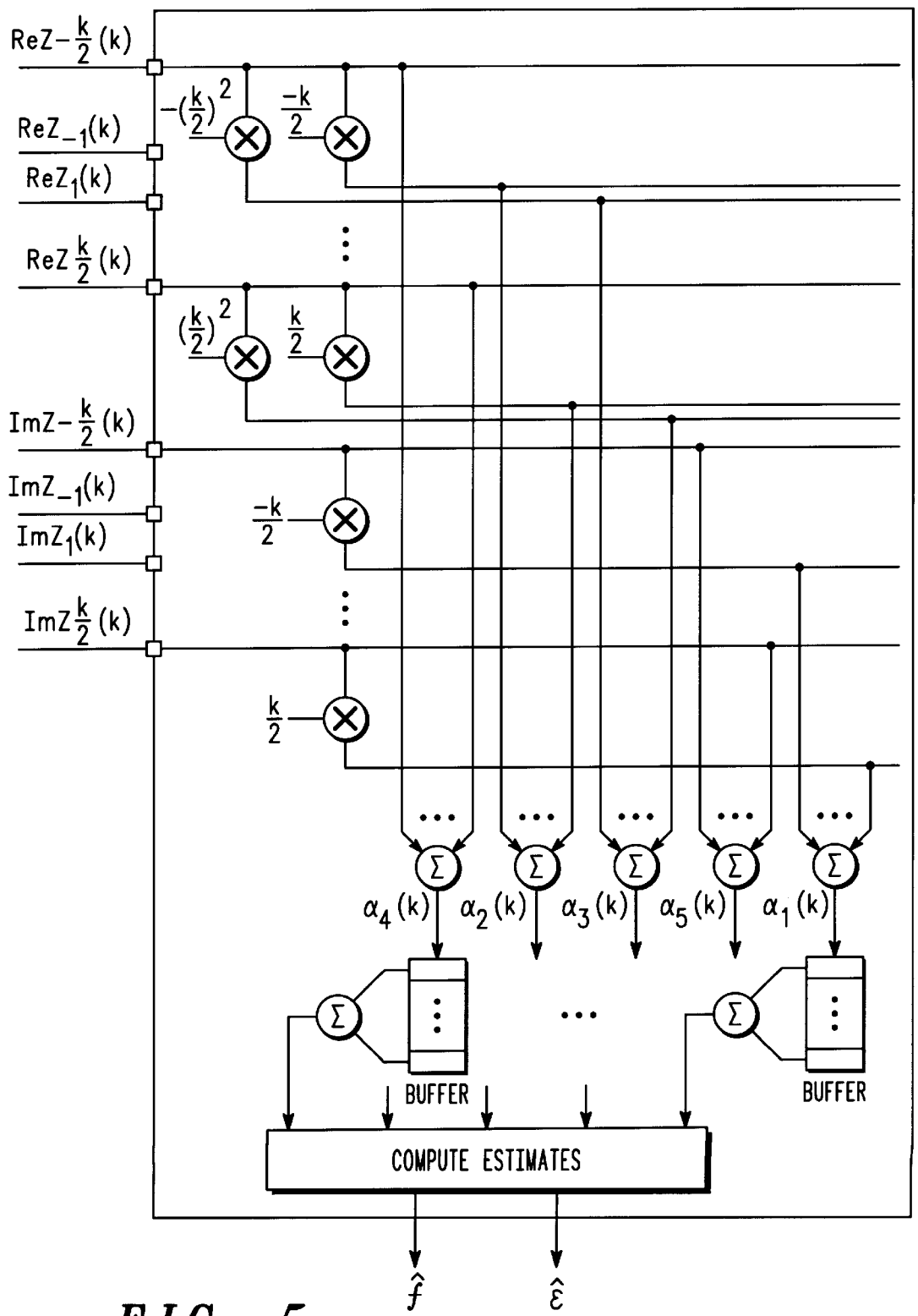
FIG. 5 is a schematic block diagram illustrating the operation of the embodiment of FIG. 4 in greater detail.

FIG. 5 represents the processing architecture for realising the corresponding third processing step in which Vm is set to 1 (unity).

In any of the embodiments, if the 1$^{st}$ order approximation of cosine and sine is not sufficient, a second or higher order approximation can be applied.

The system of equations obtained then becomes non-linear and iterative resolution methods can be applied.

Figure 6:
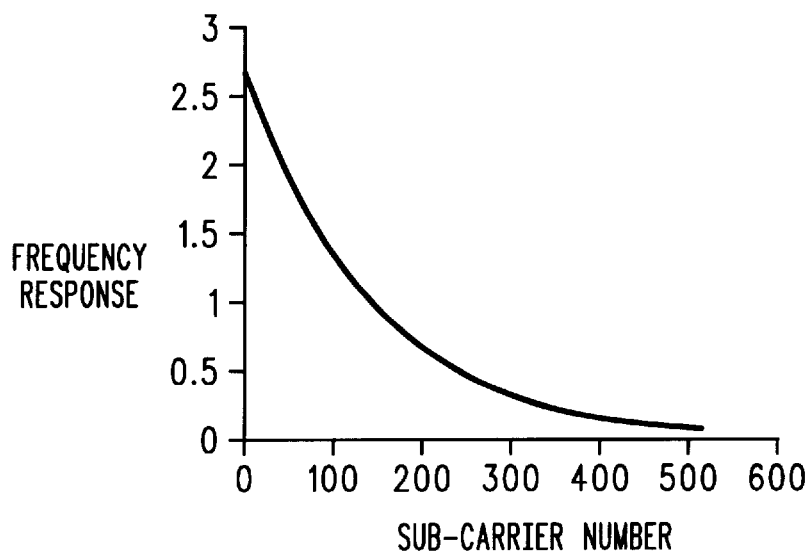
FIG. 6 is a graph showing sub-carrier index v normalised frequency response for a typical OFDM channel.

FIGS. 6 to 9 demonstrate the performance of the invention for the cases of two types of communication channel. The normalised channel frequency response in the first case is shown in FIG. 6. This corresponds to a baseband cable system. The second case relates to a typical DAB urban channel.

For cases, N=512 sub-carriers, K=384 useful sub-carriers. For each case shown, $\epsilon$ is random uniform in $[-5.10^{-5}; 5.10^{-5}]$. In the first case, f=0. In the second case, f is random uniform in $[-3.10^{-2}; 3.10^{-2}]$. 50 simulations are performed for each SNR in {8 dB;16 dB;24 dB}. The Root Mean Square (RMS) of the estimation error is computed and plotted.

Figure 7:
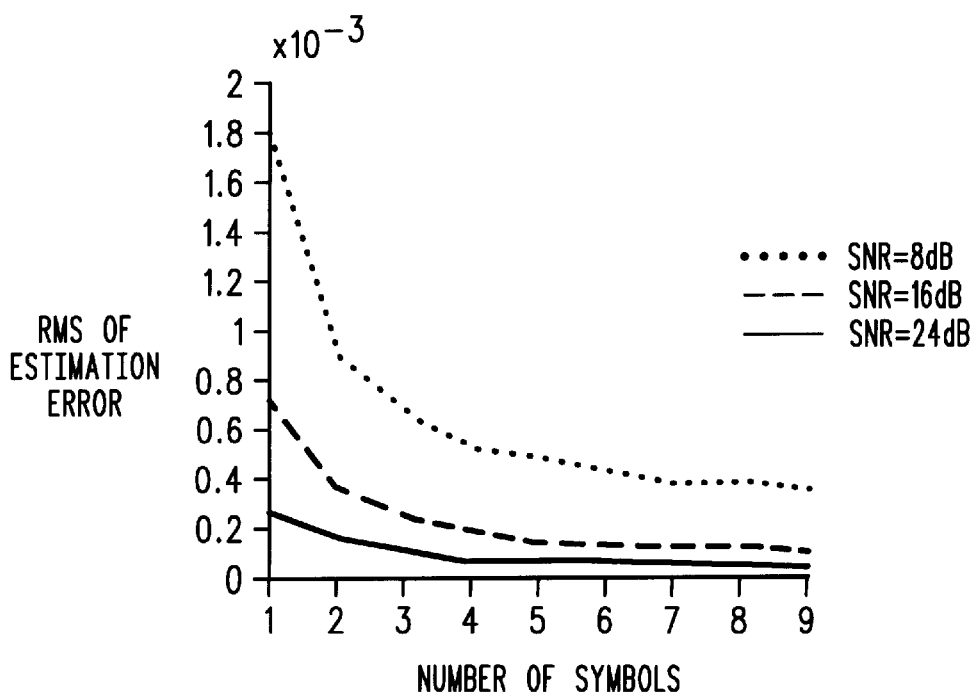
FIG. 7 is a graph showing number of symbols v RMS clock frequency offset estimation error for the OFDM channel operating in accordance with the invention.

In the first case, the RMS of the clock frequency offset estimation error is shown in FIG. 7. Averaging only on 2 successive blocks is enough to have a clock frequency offset below 10 ppm.

In the second case, the simulated system corresponds to DAB mode 2 on a typical urban channel. Here, the estimation is performed on 1 symbol out of 3, to take benefit from diversity effects. After 10 iterations, the clock frequency offset is below 20 ppm. The RMS of the clock frequency offset estimation error is shown in FIG. 8, and the RMS of the carrier frequency offset estimation error in FIG. 9. Even in such poor conditions of transmission (fast varying channel), the method swiftly reaches the targeted performance.

What is claimed is:

1. Apparatus for estimating carrier frequency offset and sampling frequency offset between transmitter circuitry and receiver circuitry which communicate over a channel of an OFDM system, the apparatus including in a receiver circuit;

a local oscillator having a frequency fb for converting a received OFDM modulated signal s(t), representing information symbols S(k) having components Sm(k) sampled at a first sampling rate ft and modulated onto a carrier of frequency fc, to a base-band signal, an analogue to digital converter having a second sampling rate fr for sampling the baseband signal, a demodulator for performing a discrete Fourier transform on the sampled baseband signal to generate blocks of symbols R(k) having components Rm(k) representing the information symbols S(k) of components Sm(k), and characterised by;

a first module for removing parasitic effects of the channel on R(k) to generate at least one block Y(k) of components Ym(k), a second module for removing modulation effects from Y(k) to generate at least one block Z(k) of components Zm(k) and to compute V of components Vm where Vm=/Ym/, and a third module for estimating terms A and B relating respectively to the carrier frequency offset /fc−fb/ and the sampling frequency offset /ft−fr/ by performing a joint maximun likelihood estimation (MLE) such that;

$$\begin{cases} \sum_{\substack{m=-\frac{K}{2} \\ m \neq 0}}^{m=\frac{K}{2}} [-V_m R(Z_m)\sin(A+mB) + V_m I(Z_m)\cos(A+mB)] = 0 \\ \sum_{\substack{m=-\frac{K}{2} \\ m \neq 0}}^{m=\frac{K}{2}} [-mV_m R(Z_m)\sin(A+mB) + mV_m I(Z_m)\cos(A+mB)] = 0. \end{cases}$$

2. Apparatus according to claim 1 in which said second module generates a plurality of blocks Z(k) and said third module adjusts coefficients of the MLE accordingly.

3. Apparatus according to claim 1 in which Vm is set to unity.

4. Apparatus according to claim 2 in which Vm is set to unity.

* * * * *